(12) United States Patent
Molina et al.

(10) Patent No.: US 12,475,105 B2
(45) Date of Patent: *Nov. 18, 2025

(54) FORENSIC CRIMINAL INVESTIGATION SUBJECT INTERACTION FILTERING TOOL FOR DIGITAL INTERACTION DATA

(71) Applicant: Radix Metasystems, Inc., Aurora, CO (US)

(72) Inventors: Peter R. Molina, Lakewood, CO (US); Todd A. Kester, Aurora, CO (US); Alan R.A. Hamor, Parker, CO (US); David Krieger, Aurora, CO (US)

(73) Assignee: LeadsOnline, LLC, Plano, TX (US)

(*) Notice: Subject to any disclaimer, the term of this patent is extended or adjusted under 35 U.S.C. 154(b) by 331 days.

This patent is subject to a terminal disclaimer.

(21) Appl. No.: 17/391,184

(22) Filed: Aug. 2, 2021

(65) Prior Publication Data

US 2022/0171765 A1    Jun. 2, 2022

Related U.S. Application Data

(60) Provisional application No. 63/119,642, filed on Nov. 30, 2020.

(51) Int. Cl.
*G06F 16/23* (2019.01)
*G06F 16/958* (2019.01)
*G06Q 50/26* (2024.01)

(52) U.S. Cl.
CPC ........ *G06F 16/2379* (2019.01); *G06F 16/972* (2019.01); *G06Q 50/265* (2013.01)

(58) Field of Classification Search
CPC .. G06F 16/2379; G06F 16/972; G06Q 50/265
See application file for complete search history.

(56) References Cited

U.S. PATENT DOCUMENTS

| | | | |
|---|---|---|---|
| 2010/0299430 A1* | 11/2010 | Powers | H04L 63/1416 709/224 |
| 2012/0084288 A1* | 4/2012 | Abdul-Razzak | G06Q 90/00 707/E17.059 |
| 2013/0097706 A1* | 4/2013 | Titonis | G06F 21/566 726/22 |
| 2014/0295787 A1* | 10/2014 | Kim | G06Q 10/00 455/405 |
| 2015/0135300 A1* | 5/2015 | Ford | G06Q 50/18 726/11 |
| 2018/0032518 A1* | 2/2018 | Kordasiewicz | G06F 16/338 |
| 2018/0145888 A1* | 5/2018 | Rahaman | H04L 41/5006 |
| 2021/0049264 A1* | 2/2021 | Barrow | G06F 9/45558 |

* cited by examiner

*Primary Examiner* — Apu M Mofiz
*Assistant Examiner* — Oscar Wehovz

(57) ABSTRACT

Some embodiments include a cloud computing system and database management for forensic criminal investigations. The cloud computing system may produce a visual representation of various digital interactions between various individuals. These digital interactions, for example, may include phone calls, text messages, emails, social media messages or posts, etc. between a first individual and a second individual. The visual representation, for example, may be provided on a webpage. The visual representation, for example, may graphically represent a relationship between the first individual and the second individual.

21 Claims, 7 Drawing Sheets

FORENSIC CRIMINAL INVESTIGATION SUBJECT INTERACTION FILTERING TOOL FOR DIGITAL INTERACTION DATA

BACKGROUND

Modern forensic criminal investigation techniques often use cell phone data and/or other digital data to track a person of interest's activity and/or to determine whom a person of interest has interacted. Digital interaction records can come from a variety of sources, have a different data structures, include different data, etc.

SUMMARY

Some embodiments include a cloud computing system for forensic criminal investigations. A cloud computing system may produce a visual representation of various digital interactions between various individuals. These digital interactions, for example, may include phone calls, text messages, emails, social media messages or posts, etc. between a first individual and a second individual. The visual representation, for example, may be provided on a webpage. The visual representation, for example, may graphically represent a relationship between the first individual and the second individual.

Systems and methods are disclosed for displaying digital interactions. A method may include maintaining in a digital interaction database a first input file comprising a first plurality of digital records of interaction between a first identifier associated with a first individual and a first plurality identifiers associated with a first plurality of individuals, the first plurality of digital records having been recorded by a first provider. The method may also include maintaining in the digital interaction database a second input file comprising a second plurality of digital records of interaction between a second identifier associated with a second individual and a second plurality of identifiers associated with a second plurality individuals, the second plurality of digital records having been recorded by a second provider. In some embodiments, the second provider being different and distinct from the first provider. In some embodiments, the method may include establishing, from the digital interaction database, a digital interaction between the first individual and the second individual. In some embodiments, the method may include creating a graphical representation of the digital interaction.

In some embodiments, the graphical representation may include a representation of the interaction between the first individual and at least a portion of the first plurality of identifiers associated with the first plurality of individuals. In some embodiments, the graphical representation may include a representation of the interaction between the second individual and at least a portion of the second plurality of identifiers associated with the second plurality of individuals. In some embodiments, the graphical representation may include a representation of the digital interaction between the first individual and the second individual.

In some embodiments, the graphical representation of the interaction between the first individual and at least a portion of the first plurality of identifiers associated with the first plurality of individuals further comprises: a graphical representation of the first individual, and a chronological listing of at least a portion of the first plurality of identifiers associated with the first plurality of individuals.

In some embodiments, the graphical representation of the interaction between the second individual and at least a portion of the second plurality of identifiers associated with the second plurality of individuals further comprises a graphical representation of the second individual, and a chronological listing of at least a portion of the second plurality of identifiers associated with the second plurality of individuals.

In some embodiments, the representation of the digital interaction between the first individual and the second individual includes the date of the digital interaction.

In some embodiments, the representation of the digital interaction between the first individual and the second individual includes the duration of the digital interaction.

In some embodiments, the representation of the digital interaction between the first individual and the second individual includes the content of the digital interaction.

In some embodiments, the representation of the digital interaction between the first individual and the second individual includes images sent as part of the digital interaction.

In some embodiments, the representation of the digital interaction between the first individual and the second individual includes the type of digital interaction.

In some embodiments, the representation of the digital interaction between the first individual and the second individual includes images sent as part of the digital interaction.

In some embodiments, the representation of the digital interaction between the first individual and the second individual includes an indication of the sender of the digital interaction and the receiver of the digital interaction.

In some embodiments, each digital interaction within the digital interaction database comprises at least a date of the digital interaction, a time of the digital interaction, an identifier identifying the sender of the digital interaction, and an identifier identifying the receiver of the digital interaction.

In some embodiments, each digital interaction within the digital interaction database comprises at least one of the following: a location of the sender of the digital interaction, a location of the receiver of the digital interaction, a cell tower location associated with a sender of the digital interaction, a cell tower location associated with a receiver of the digital interaction, digital interaction content, photos, text, and a duration of the digital interaction.

In some embodiments, the first input file is organized differently than the second input file. In some embodiments, the first input file includes data that is not included in the second input file.

In some embodiments, the first provider or the second provider comprises a cell phone carrier. In some embodiments, wherein the first provider or the second provider comprises a social media company.

In some embodiments, the first input file or the second input file comprises cell phone records. In some embodiments, the first input file or the second input file comprises social media records. In some embodiments, the first input file or the second input file includes a plurality of records, each of the plurality or records including one or more of the following: an interaction date, an interaction time, a sender name, a sender ID, a sender phone number, a sender email address, a sender username, a receiver name, a receiver ID, a receiver phone number, a receiver email address, a receiver username, a GPS location of the sender, a GPS location of the receiver, a tower location of the sender, a tower location of the receiver, a tower identifier of the sender, a tower identifier of the receiver, and interaction content.

DETAILED DESCRIPTION

Figure 1:
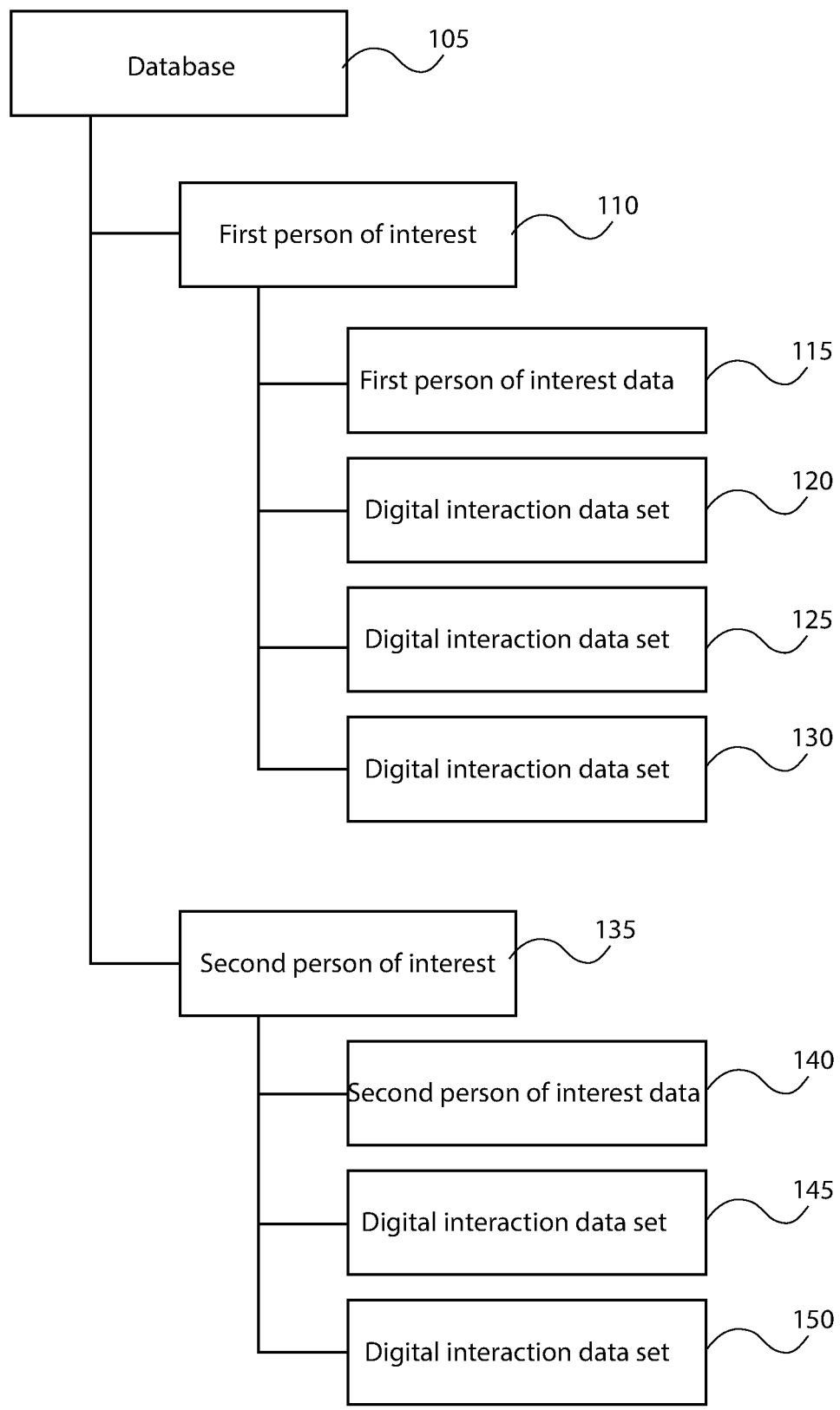
FIG. 1 is a block diagram of a digital interaction database according to some embodiments.

A digital interaction data base is disclosed that includes a plurality of digital interaction data sets from different digital interaction providers. A digital interaction, for example, may include a cell phone record, a text message record, an email record, a social media record, a messenger record, a WhatsApp record, a snapchat record, a financial transaction record, a GPS tracker, mobile phone GPS data, etc.

A digital interaction data set, for example, may be used to interactively display digital interactions of individuals in an investigation. These digital interactions may, for example, provide information about how often and how long individuals interact digitally. As another example, these digital interactions may provide information about the location of an individual during a digital interaction.

Some embodiments disclose creating a digital interaction database. And some embodiments disclose linking associated digital interactions across different digital interaction data sets.

A digital interaction data set may include a history of digital interactions between an individual associated with the digital interaction and a plurality of other individuals.

In some embodiments, a digital interaction may include one or more of the following fields: an interaction date, an interaction time, an interaction duration, a sender name, a sender ID (e.g., phone number, email address, handle, username, account number, social media id, advertising id, etc.), a receiver name, a receiver ID (e.g., phone number, email address, handle, username, account number, social media id, advertising id, etc.), a GPS location of the sender, a GPS location of the receiver, a tower location of the sender, a tower location of the receiver, a tower identifier of the sender, a tower identifier of the receiver, IP-address of the sender, an IP address of the receiver, bank account number of the resender, a bank account number of the receiver, interaction content, amount of money sent or received, social media history, social media posts, social media messages, social media contacts, calendar data, internet search history, cookie data, webpage interaction data, phone app usage history, financial documents, computer forensic data, computer, tablet, and/or phone usage data, etc.

For example, a digital interaction from a mobile phone using a first carrier may include the following: latitude of the tower, longitude of the tower, the time of the interaction, the outgoing phone number, the called phone number, and the direction of the call.

As another example, a digital interaction from a mobile phone using a second carrier may include the time of the interaction, a cell tower identifier, the outgoing phone number, the called phone number, and the direction of the call. In addition, the second carrier may include a second record or data set that correlates the cell tower identifier with a latitude of the tower and a longitude of the tower.

In some embodiments, a digital interaction data set may include a plurality of digital records of digital interaction between individuals (or persons of interest). These digital interactions may include any type of digital interaction.

In some embodiments, the type of data in a digital interaction data set may vary depending on the digital interaction provider of the digital interaction data set. For example, a cell phone digital interaction data set may include data that is different than a social media digital interaction data set or an ankle bracelet digital interaction data set.

In some embodiments, the format of the digital interaction data set may vary depending on the digital interaction provider of the digital interaction data set. For example, a digital interaction data set may be formatted as a csv file, an excel file, a text file, an XML file, an HTML file, a zip archive containing multiple files including media such as images, video, etc.

In some embodiments, two different digital interaction data sets may include a plurality of rows of data comprising different digital records of interactions yet have columns with different data types. In some embodiments, two different digital interaction data sets may include a plurality of rows of data comprising different digital records of interactions organized with different columns of data for each digital record of an interaction.

In some embodiments, each digital interaction data set may be associated with an individual. In some embodiments, two different digital interaction data sets may be associated with two different individuals.

For example, a GPS tracking digital interaction data set (e.g., from a GPS tracking ankle bracelet) may include one or more of the following columns of data: agency name, officer name, name of the monitored person, event name, event time (possibly more than one time zones), location, GPS valid data, GPS High confidence data, and/or GPS confidence data, etc.

As another example, a digital interaction data set may include one or more of the following columns of data: Calling-MDN, Called-MDN, Billing-MDN, Destination-Number, Dialed-Number, Date, Time, Timezone, Timezone-type, Duration, Direction, MSC-ID, LAC-CI, LAC-Dec, CI-Dec, Enode-Dec, TRoute, Ans-Status, Comp-Code, Service-Codes, first-Latitude, first-Longitude, first-sectorid, first-azimuth, first-address, first-city, first-state, first-zip, last-Latitude, last-Longitude, last-sectorid, last-azimuth, last-address, last-city, last-state, last-zip, MSC-name, Call-Type, Service-Center, IMSI, Imei, Disconnecting-Party, Srvcc-Indicator, and/or Sms-Result, etc.

As another example, a digital interaction data set may include one or more of the following columns of data: phone number, Electronic Serial Number (ESN), call start time, duration (e.g., in seconds), vendor, call type, latitude, longitude, distance (e.g., in miles), sector, cascade id, or BAN, etc. In some embodiments, the latitude and/or the longitude may comprise the latitude and/or the longitude of the device making the digital interaction or the cell phone tower communicating with the device.

As another example, a digital interaction data set may include one or more of the following columns of data: calling number, called number, dialed digits, call direction (e.g., outbound, inbound, routed, etc.), start date, end date, duration (sec), network element identifier (neid), phone switch (repoll), 1st cell (the first cell site that was used during a call), or last cell (the last cell site that was used during a call), etc.

As another example, a digital interaction data set may include one or more of the following columns of data: item, connection date & time (e.g., UTC), seizure time (e.g., the time it takes for the call to connect to the network), elapsed time, originating number, terminating number, IMEI, international mobile subscriber identity (IMSI), call type (CT) (Mobile Originating (MO), Mobile Terminating (MT), Service Originating (SO), Service Terminating (ST), etc.), feature, dialed, for example, forwarded, translated, orig_orig, make of the handset, model of the handset, or cell location, etc.

In some embodiments, a digital interaction provider may include a mobile phone carrier (e.g., Verizon, AT&T, T-Mobile, Sprint, etc.), a social media company (e.g., Facebook, LinkedIn, SnapChat, Instagram, TikTok, etc.), a messaging company (e.g., messenger, WhatsApp, WeChat, iMessage, Messages, etc.), a mobile phone provider (e.g., Android, Apple, etc.), a map company (e.g., Google Maps, Apple Maps, etc.), an advertising id tracking company (e.g., Babel X), etc.

In some embodiments, a person of interest record may include one or more digital interaction data sets. In some embodiments, each person of interest (or individual) may be associated with data from one digital interaction provider or many different digital interaction providers.

FIG. 1 is a block diagram of a digital interaction database 105 according to some embodiments. The digital interaction database 105 may include the digital interactions for one person of interest (or individual) or a plurality of persons of interest (or individuals). A person of interest may include person of interest in an investigation such as, for example, suspects, victims, witness, defendant, associate, etc. In this specific example, the digital interaction database 105 includes two persons of interest: the first person of interest 110 and the second person of interest 135.

In this example, the first person of interest 110, may include first person of interest data 115. The first person of interest data 115 may include data about the first person of interest such as, for example, name, age, photograph(s), phone number, email address, address, social media ID, license plate, advertising id, other identifiers, etc.

In this example, the first person of interest 110, may include the first digital interaction data set 120, the first digital interaction data set 125, and the first digital interaction data set 130 (collectively, the first person of interest data sets). Other additional digital interaction data sets may also be uploaded and included with the first person of interest. The first person of interest data sets may include any digital interaction data set described in this document or other digital interaction data sets.

For example, the first digital interaction data set 120 may include a history of telephone records of the first person of interest to and from various other individuals. The first digital interaction data set 125 may include a history of text messages to and from the first person of interest to and from various other individuals. The first digital interaction data set 130 may include a history of digital interactions of the first person (e.g., posts, comments, images, videos, etc.) of interest on a social media platform.

In this example, the second person of interest 135, may include the second person of interest data 140. The second person of interest data 140 may include data about the first person of interest such as, for example, name, age, photograph(s), phone number, email address, address, social media ID, license plate, advertising id, other identifiers, etc.

In this example, the second person of interest 135, may include the second digital interaction data set 145 and the second digital interaction data set 150 (collectively, the second person of interest data sets). Other additional digital interaction data sets may also be uploaded and included with the second person of interest. The second person of interest data sets may include any digital interaction data set described in this document or other digital interaction data sets.

For example, the second digital interaction data set 120 may include a history of telephone records of the first person of interest to and from various other individuals. The second digital interaction data set 125 may include a history of text messages to and from the first person of interest to and from various other individuals. The second digital interaction data set 130 may include a history of digital interactions of the first person (e.g., posts, comments, images, videos, etc.) of interest on a social media platform.

In some embodiments, a first digital interaction in one of the first person of interest data sets and a second digital interaction in one of the second person of interest data sets can be linked such as, for example, in the data set directory 240. For example, the first digital interaction may include a history of phone records between the first person of interest and a number of other people. If one of these other people includes the second person of interest, the digital interaction (e.g., the phone call between the two) in the first person of interest data sets and the digital interaction in the second person of interest data sets can be linked. As another example, the first digital interaction may include a history of messages (e.g., text, SMS, messenger, WhatsApp, WeChat, etc.) between the first person of interest and a number of other people. If one of these other people includes the second person of interest, the digital interaction (e.g., the message between the two) in the first person of interest data sets and the digital interaction in the second person of interest data sets can be linked.

Two digital interactions can be linked in a number of different ways. As one example, the first person of interest data 115 may include a first phone number. An algorithm executing on a process (e.g., in the cloud) may search all or most digital interactions within all digital interaction data sets (e.g., other than the person of interest associated with the first phone number) for phone calls to or from the first phone number. This can be done for each phone number, messenger ID, email address, etc. associated with the first person of interest and or stored in the first person of interest data 115. This may also be done for each person of interest.

As another example, each digital interaction associated with one person of interest may be compared with each digital interaction associated with another person of interest. If a correlation is found, a link between the two digital interactions may be created. For example, an algorithm may select a first digital interaction from a first digital interaction data set. An identifier (e.g., phone number, email address, Id, username, etc.) associated with the first digital interaction may be extracted. This identifier may then be used to search all or most digital interactions within all digital interaction data sets for the identifier. If a match is found between the identifier and another digital interaction, then a link between the digital interactions can be made.

A link between digital interactions, for example, shows that a digital interaction occurred between the two persons of interest. This digital interaction may also be associated with duration data, the direction of the digital interaction, the location of the sender or the receiver, and/or content of the digital interaction, etc.

Figure 2:
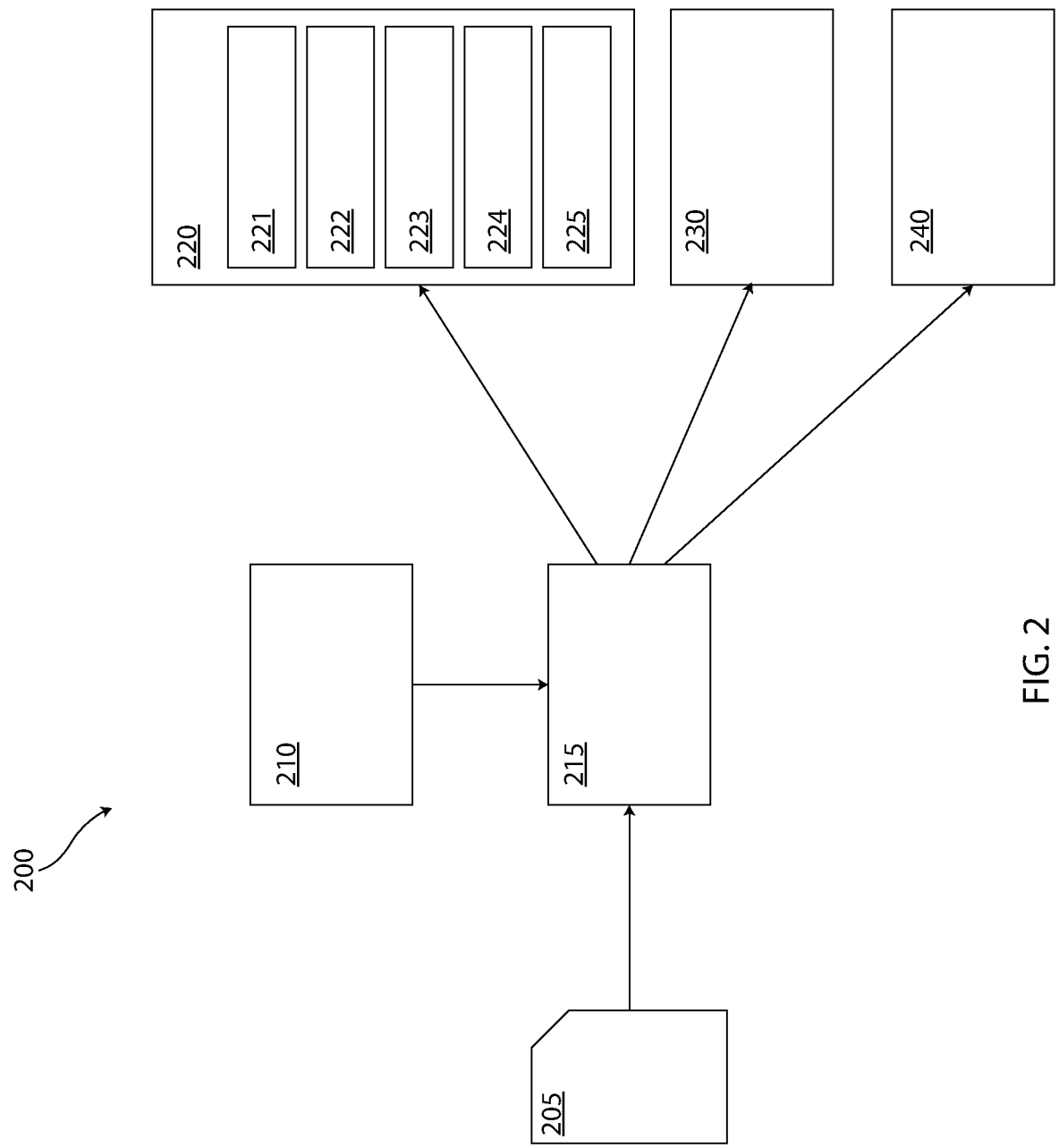
FIG. 2 is a block diagram of a process for creating a digital interaction database according to some embodiments.

FIG. 2 is a block diagram of a processing structure 200 for creating a digital interaction database according to some embodiments.

One or more input files 205 can be processed with processor 215 using mapping definition 210 into one or more digital interaction data sets 230 and/or one or more digital interaction data set descriptors 220.

The processor 215 may include any or all elements of the computational system 600. The processor 215 may be a cloud based processor with one or more dedicated and/or remote processors. The processor 215 may operate on one or more digital interaction data sets.

The processor 215 may include a plurality of processors. Each processor 215 of the plurality of processors may process a specific type of input file 205. For example, a first processor may process Verizon phone records. A second processor, for example, may process Facebook records. A third process, for example, may process AT&T phone records. A fourth processor, for example, may process messaging records. Various other specific processors may also be used.

The processor 215 may process the input file 205 based on a mapping definition 210. The mapping definition 210 may define transformations for each field in a specific input file 205 to one or more digital interaction data sets 230. The mapping definition 210 may define how the processor 215 maps data from one or more input file 205 to data in one or more digital interaction data sets 230.

In some embodiments, the processor 215 may create a single digital interaction data set 230 from a single input file 205 using the mapping definition 210.

In some embodiments, the processor 215 may create a plurality of digital interaction data sets 230 from a single input file 205 using the mapping definition 210. For example, an input file 205 from a wireless carrier such as, for example, AT&T, may include phone data, text data, and Internet data access records in a single input file 205. Each of these data may be mapped into one or more digital interaction data sets 230. As another example, a Google input file 205 may include email data, photo data, GPS data, search history data, IP data list, device access data, etc. Each of these may be mapped into one or more digital interaction data sets 230.

In some embodiments, the processor 215 may create a single digital interaction data sets 230 from a plurality of input files 205 using the mapping definition 210. For example, an input file 205 from a wireless carrier such as, for example, Verizon, may require a phone input file 205, a text input file 205, and/or a cell tower input file 205. Two or more of these input file 205 may be mapped into a single digital interaction data sets 230.

In some embodiments, each digital interaction data sets 230 may include a JSON File (or a JSON Lines file or an XML file or the like) where each row includes a data item transformed (or mapped) from the input file 205 and/or described by the digital interaction data set descriptors 220. In some embodiments, each data item may include a JSON object composed of key/value pair data. A value may be complex such as a location feature or a simple value such as a string, number, date, etc. A key/value pair, for example, may include the following data: data source, data type, provider, date produced, number or account of interest, date of production, date of processing, etc.

In some embodiments, the processor 215 may produce a digital interaction data set descriptor 220. In some embodiments, the digital interaction data set descriptor 220 may be stored in a cloud database. The digital interaction data set descriptor 220, for example, may describe various components of a digital interaction data set. The digital interaction data set descriptor 220, for example, may include data set metadata 221, data set metadata key info 222, data item key info 223, data item key characterization 224, and/or data item key connectors 225.

The data set metadata 221 may include information about the digital interaction data sets 230 such as, for example, specifics for each key/value pair in the digital interaction data set 230, the type of data, account number, subscriber phone number, a social media id, an account number, email address, name, what processor was used, phone number(s), dates, the source of an associated digital interaction data sets 230, the date the data was uploaded, whether the data is a "special" type, the connections between fields that describe interactions, etc. As another example, the digital interaction data set descriptor 220 may include specific meta-data derived from the input file 205 such as the, etc.

In some embodiments, the data set metadata key info 222 may describe the type of information contained in each key/value field for the digital interaction data set. For example, if the data is considered an important type, a category can be set that allows the field to be used generically. In some embodiments, data set metadata key info 222 may describe the columns of the digital interaction data sets 230. The data set metadata key info 222, for example, may include information about what the keys in the Data Set Meta Data mean.

In some embodiments, the data item key info 223 may describe the data for use and display for each key/value in the digital interaction data set. The data item key info 223 may also identify the special usable types for more generic use by the tools such as, for example, a phone number, email address, social media id, account number, location information, etc. The data item key info 223, for example, describes the fields in the data item. As another example, the data item key info 223, may identify whether the data a special type of data. As another example, the data item key info 223, may include a title for columns in a list tool, the source column name and/or the units for each column.

In some embodiments, the data item key characterization 224 may include statistics about a digital interaction data set 230. For example, the data item key characterization 224 may include statistics or enumeration for each column, the type of data (e.g., strings, integers, dates, phone numbers, etc.), ranges, etc., etc.

In some embodiments, the data item key connectors 225 define connections between data sets and/or interactions between two type of fields. This may include, for example, to-from relationships such as, between two callers (e.g., caller number and called number), between senders and receivers of messages or emails (e.g., message sender and message receiver), etc. In some embodiments the data item key connectors 225 may label the type of interaction such as, for example, "CALL", "MESSAGE", "COMMENT", "MONEY" etc.

A data item key connector 225 may be a connection between a first individual and a second individual based on common data within the corresponding first person of interest data set(s) and the second person of interest data set(s). For example, a data item key connector 225 may include a phone call between the first individual and a second individual. As another example, a data item key connector 225 may include a text message, SMS message, Facebook Messenger message, WeChat message, WhatsApp message, etc. between the first individual and the second individual. As another example, a data item key connector 225 may include a social media post or comment between the first individual and the second individual. As another example, a data item key connector 225 may include a GPS location of the first individual overlapping with the GPS location of the second individual. As another example, a data item key connector 225 may include a financial transaction, a money transfer, a loan, a payment, etc. between the first individual and the second individual.

In some embodiments, the processor 215 may also update a data set directory 240. The processor 215 may extract directory information associated with each digital interaction data sets 230. The data set directory 240 may include a list of contacts from an email archive, friends from a social media file (e.g., Facebook file), or phone numbers from source files, etc. that can be used to associate the identifier to a specific individual (or alias). A single data set directory 240 may include directory information from a plurality of digital interaction data sets 230.

For example, an AT&T input file 205 may include calls, text messages, and data access records (e.g., internet browsing) that can be mapped by the processor 215 into three separate digital interaction data sets 230 and digital interaction data set descriptors 220.

As another example, a Verizon (or Sprint) input file 205 may include multiple data files that can be mapped into one or more digital interaction data sets 230.

As another example, a Facebook input file 205 may include one or more files that include messages, wall posts, status updates, pictures, IP History, etc. that may be mapped into one or more digital interaction data sets 230 and/or one or more digital interaction data set descriptors 220.

As another example, a Google input file 205 may include one or more files that include messages (with or without message content), contacts, emails, photos, GPS data, search history data, IP data, device access list data, etc. that may be mapped into one or more digital interaction data sets 230 and/or one or more digital interaction data set descriptors 220.

As another example, an Apple input file 205 may include one or more files that include email, iMessages (with or without content), photos, photos, GPS data, search history data, IP data, device access list data, contacts, etc. that may be mapped into one or more digital interaction data sets 230 and/or one or more digital interaction data set descriptors 220.

As another example, a phone scrape file (e.g., from Cellbrite) may include one or more files that include app data, location data, email data, text data (with or without content), phone data, IP data, device access list data, contacts, that may be mapped into one or more digital interaction data sets 230 and/or one or more digital interaction data set descriptors 220.

As another example, an advertising aggregator input file 205 may include ID tracking data with GPS data that may be mapped into one or more digital interaction data sets 230 and/or one or more digital interaction data set descriptors 220.

As another example, a GPS tracker (e.g., ankle, car, etc.) may include a list of GPS data associated with a date and time that may be mapped into one or more digital interaction data sets 230 and one or more digital interaction data set descriptors 220.

One or more digital interactions within the digital interaction database may include a number of data items. For example, these data items may include a date of the digital interaction, a time of the digital interaction, an identifier associated with the sender of the digital interaction, and/or an identifier associated with the receiver(s) of the digital interaction, the content of the interaction, the duration of the interaction, etc. These digital interactions may be linked in the data set directory 240.

In some embodiments, the digital interaction database can include a third digital interaction data set, a fourth digital interaction data set, a fifth digital interaction data set, etc. The digital interactions in the digital interaction database may include interactions between two or more individuals from the various digital interaction data sets.

Figure 3:
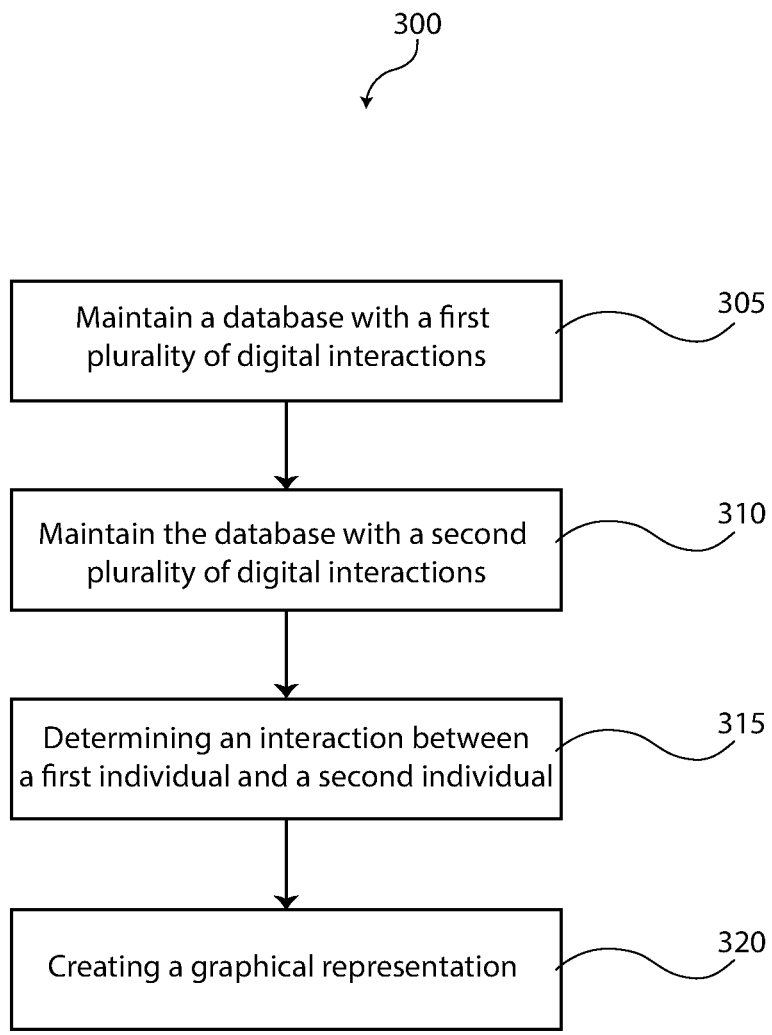
FIG. 3 is a flowchart of a process for providing a subject filtering tool for a digital interaction database according to some embodiments.

FIG. 3 is a flowchart of a process 300 for providing a subject filtering tool for a digital interaction database according to some embodiments. The blocks of process 300 may occur in any order. Additional blocks may be added to process 300. Some blocks may be removed, skipped, or modified. The process 300 may be executed by computational system 600 and/or cloud computing system 700.

At block 305 a first input file may be maintained in a digital interaction database. The first input file may include a first plurality of digital records of interaction between a first identifier associated with a first individual and a first plurality identifiers associated with a first plurality of individuals. The first plurality of digital records may have been recorded by a first provider.

At block 310 a second input file may be maintained in a digital interaction database. The second input file may include a second plurality of digital records of interaction between a second identifier associated with a second individual and a second plurality identifiers associated with a first plurality of individuals. The second plurality of digital records may have been recorded by a second provider.

In some embodiments, the second provider may be different and/or distinct from the first provider. In some embodiments, the second provider may be the same as the first provider.

In some embodiments, additional input files may be used that are similar to the first input file and/or the second input file.

In some embodiments, the first digital interaction and/or the second digital interaction may include a cell phone record, a text message record, an email record, a social media record, a messenger record, a WhatsApp record, a snapchat record, a financial transaction record, a GPS tracker, mobile phone GPS data, etc.

In some embodiments, the first provider and/or the second provider may include a mobile phone carrier (e.g., Verizon, AT&T, T-Mobile, Sprint, etc.), a social media company (e.g., Facebook, LinkedIn, SnapChat, Instagram, TikTok, etc.), a messaging company (e.g., messenger, WhatsApp, WeChat, iMessage, Messages, etc.), a mobile phone provider (e.g., Android, Apple, etc.), a map company (e.g., Google Maps, Apple Maps, etc.), an advertising id tracking company (e.g., Babel X), etc.

At block 315 a digital interaction between the first individual and the second individual may be determined, created, established, found, etc. In some embodiments, the first identifier may be searched for in the second digital interaction database. In some embodiments, the second identifier may be searched for in the first digital interaction database.

In some embodiments, a digital interaction may include one or more of the following: a phone call between the first individual and the second individual, a text message between the first individual and the second individual, an SMS message between the first individual and the second individual, a WhatsApp message between the first individual and the second individual, a messenger message between the first individual and the second individual, a Facebook (or other social media) comment between the first individual and the second individual, etc., etc. In some embodiments, a digital interaction may include any type of recorded interaction between two parties via electronic means.

Figure 4:
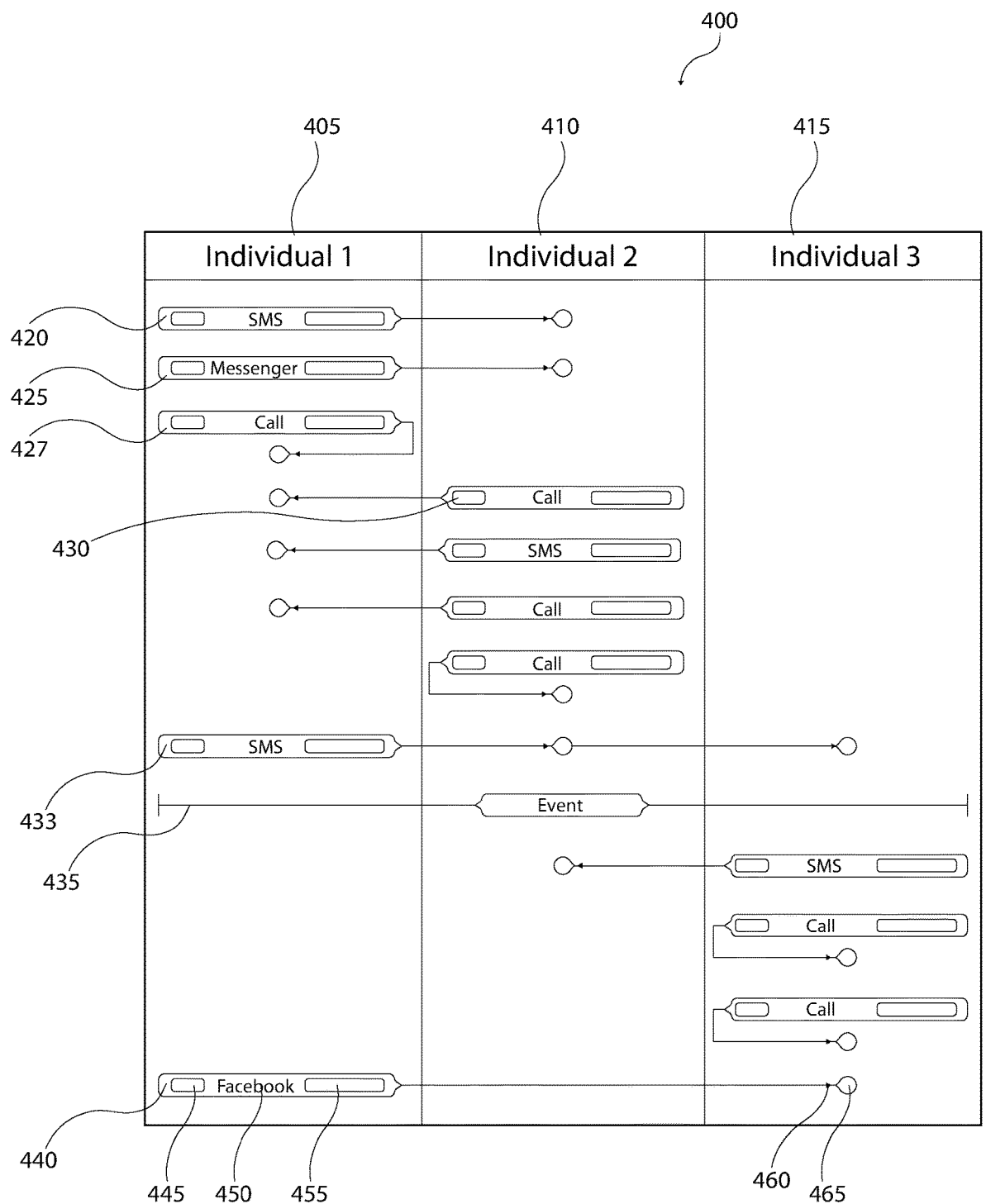
FIG. 4 is an example graphical representation of digital interactions between subjects according to some embodiments.

For example, a digital interaction may be determined between a set of individuals. In FIG. 4, there are three individuals in a set of individuals. Any number of individuals may be used. For each individual, the various identifiers of the individuals may also be identified such as, for example, phone numbers, emails, social media IDs, etc. All the digital interaction data sets associated with a first individual may be analyzed to identify digital interactions between the first individual and any of the other individuals, for example, by searching for the identifiers of the other individuals. The digital interaction data sets associated with the other individuals may also be analyzed to identify digital interactions between the individual and any of the other individuals, for example, by searching for the identifiers of the other individuals.

In some embodiments, a digital interaction between the first individual and the second individual may be determined based on the data item key connectors 225.

At block 320 a graphical representation may be created for display on a screen. The graphical representation may be part of a webpage stored or hosted at a cloud computing location. The graphical representation may, for example, include a representation of the digital interaction between the first individual and at least a portion of the first plurality of identifiers associated with the first plurality of individuals. The first plurality of identifiers may be received from a first provider. The graphical representation may include a representation of the digital interaction between the first individual and a third plurality of identifiers associated with a third plurality of individuals. The third plurality of identifiers may be received from a third provider that may be different than the first provider.

The graphical representation may, for example, include a representation of the interaction between the second individual and at least a portion of the second plurality of identifiers associated with the second plurality of individuals. The graphical representation may, for example, include a representation of the interaction between the second individual and at least a portion of the third plurality of identifiers associated with the third plurality of individuals.

The graphical representation may, for example, include a representation of the digital interaction between the first individual and the second individual. The graphical representation may, for example, include the graphical representation 400 shown in FIG. 4.

The graphical representation, for example, may include a representation of one or more of the following: a date, a name, the interaction type (e.g., a logo, icon, emoji, gui, etc.), a digital interaction sender, a digital interaction receiver, a duration of the digital interaction, etc. In some embodiments, the graphical representation may be organized chronologically. In some embodiments, the graphical representation may include digital interactions that occurred within a specific or user specified time period.

The graphical representation, for example, may include columns showing different individuals or subjects and a plurality of digital interactions for each individual.

A digital interaction, for example, between the first individual and the second individual may be determined from the first plurality of digital interactions, and a similar digital interaction may be determined from the second plurality of digital interactions. A de-duplication process may occur. The de-duplication process, for example, may analyze a set of digital interactions and determine whether two digital interactions may be the same such as, for example, by analyzing the sender of the digital interaction, the date of the digital interaction, the type of digital interaction (e.g., phone, message, text, social media, etc.), the date and time of the digital interaction, the duration of the digital interaction, etc.

FIG. 4 is an example graphical representation 400 of digital interactions between individuals according to some embodiments. The graphical representation 400, for example, may be referred to as the subject interaction filter tool. The graphical representation 400, for example, may include digital interactions of or between Individual 1, Individual 2, and Individual 3. While the graphical representation of digital interactions of or between three individuals are shown, the graphical representation of digital interactions of or between any number of individuals may be shown.

The digital interactions of individual 1 are displayed in column 405. The digital interactions of individual 2 are displayed in column 410. The digital interactions of individual 3 are displayed in column 415. For example, the digital interactions between a first individual and a second individual may be determined by linking digital interactions between a digital interaction dataset associated with the first individual and a digital interaction data set associated with the second individual. As another example, the digital interactions between a first individual and a second individual may be determined from a digital interaction dataset associated with the first individual and a user identifier associated with the second individual. As another example, the digital interactions between a first individual and a second individual may be determined based on process 300 or process 500.

The digital interaction representation 420 is a graphical representation of a digital interaction between individual 1 and individual 2. In this example, the digital interaction representation 420 is an SMS message sent from individual 1 to individual 2. The digital interaction representation 420, for example, includes a first graphical shape (e.g., a box, oval, polygon, circle, rectangle, etc.) positioned within the column 405, a second graphical shape (e.g., a box, oval, polygon, circle, rectangle, etc.) positioned within the column 410, and a line connecting the two graphical shapes. The first graphical shape, for example, may include additional information about the digital interaction such as, for example, the type of digital interaction, the date of the digital interaction, the duration of the digital interaction, the location of the digital interaction, etc.

The digital interaction representation 425 is a graphical representation of a digital interaction between individual 1 and individual 2. In this example, the digital interaction is a Facebook Messenger interaction. As shown, the listing of digital interactions between Individual 1 includes different digital interactions from different providers. The digital interaction representation 425, for example, includes a first graphical shape (e.g., a box, oval, polygon, circle, rectangle, etc.) positioned within the column 405, a second graphical shape (e.g., a box, oval, polygon, circle, rectangle, etc.) positioned within the column 410, and a line connecting the two graphical shapes. The first graphical shape, for example, may include additional information about the digital interaction such as, for example, the type of digital interaction, the date of the digital interaction, the duration of the digital interaction, the location of the digital interaction, etc.

The digital interaction representation 427 is a graphical representation of a digital interaction between individual 1 and another phone or identifier associated with individual 1. In this example, the digital interaction is a phone call from one phone associated with individual 1 to a second phone (e.g., a burner phone) associated with individual 1. The digital interaction representation 427, for example, includes a first graphical shape (e.g., a box, oval, polygon, circle, rectangle, etc.) positioned within the column 405, a second graphical shape (e.g., a box, oval, polygon, circle, rectangle, etc.) positioned within the column 405, and a line connecting the two graphical shapes. The first graphical shape, for example, may include additional information about the digital interaction such as, for example, the type of digital interaction, the date of the digital interaction, the duration of the digital interaction, the location of the digital interaction, etc.

The digital interaction representation 430 is a graphical representation of a digital interaction between individual 1 and individual 2. In this example, the digital interaction representation 430 is a phone call sent from individual 2 to individual 1. The digital interaction representation 430, for example, includes a first graphical shape (e.g., a box, oval, polygon, circle, rectangle, etc.) positioned within the column 410, a second graphical shape (e.g., a box, oval, polygon, circle, rectangle, etc.) positioned within the column 405, and a line connecting the two graphical shapes. The first graphical shape, for example, may include additional information about the digital interaction such as, for example, the type of digital interaction, the date of the digital interaction, the duration of the digital interaction, the location of the digital interaction, etc.

The digital interaction representation 433 is a graphical representation of a digital interaction between individual 1 and at least two other individuals: individual 2 and individual 3. As shown, the digital interaction representation 433 has a graphical representation in the first column 405 associated with individual 1 and a graphical representation in both the middle column 410 and the last column 415 showing an interaction occurred from the individual 1 to both individual 2 and individual 3. In this example, a group SMS message was sent from individual 1 to both individual 2 and individual 3. A similar graphical representation could be used to represent a multi-person phone call, a social media interaction between a plurality of individuals, etc.

The digital interaction representation 433 is a graphical representation of a digital interaction between individual 1, individual 2, and individual 3. The digital interaction representation 433, for example, includes a first graphical shape (e.g., a box, oval, polygon, circle, rectangle, etc.) positioned within the column 405, a second graphical shape (e.g., a box, oval, polygon, circle, rectangle, etc.) positioned within the column 410, a third graphical shape (e.g., a box, oval, polygon, circle, rectangle, etc.) positioned within the column 415, and a line connecting the three graphical shapes. The first graphical shape, for example, may include additional information about the digital interaction such as, for example, the type of digital interaction, the date of the digital interaction, the duration of the digital interaction, the location of the digital interaction, etc.

The event representation 435 is a graphical representation of an event that has been entered by a user. The event representation 435 may represent any type of occurrence that occurred at a specific date and/or time. The event representation 435 may be positioned chronologically or reverse chronologically in the graphical representation 400 such as, for example, where the more recent events or interactions are shown lower in the graphical representation or vice versa.

The digital interaction representation 435, for example, includes a first graphical shape (e.g., a box, oval, polygon, circle, rectangle, etc.) positioned within the column 410, which may be associated with the second user who may have established the event, a second graphical shape (e.g., a box, oval, polygon, circle, rectangle, etc.) positioned within the column 405, a second graphical shape (e.g., a box, oval, polygon, circle, rectangle, etc.) positioned within the column 415, and a line connecting the two graphical shapes. The first graphical shape, for example, may include additional information about the digital interaction such as, for example, the type of digital interaction, the date of the digital interaction, the duration of the digital interaction, the location of the digital interaction, etc.

The digital interaction representation 440 is a graphical representation of a digital interaction between individual 1 and individual 3. In this example, the digital interaction representation 440 is a Facebook comment or post from individual 1 to individual 3.

A digital interaction, for example, digital interaction representation 440, may include one or more images (or videos). The one or more image, for example, may be displayed with the digital interaction representation.

The digital interaction representation 440, for example, includes a first graphical shape (e.g., a box, oval, polygon, circle, rectangle, etc.) positioned within the column 405, a second graphical shape (e.g., a box, oval, polygon, circle, rectangle, etc.) positioned within the column 415, and a line connecting the two graphical shapes. The first graphical shape, for example, may include additional information about the digital interaction such as, for example, the type of digital interaction, the date of the digital interaction, the duration of the digital interaction, the location of the digital interaction, etc.

As another example, a visual representation of an image (e.g., an icon, or favicon, or thumbnail) that may be displayed with the digital interaction representation and may be selected by a user. An image (or videos) may remain in the file provided by the provider and may be viewed when the user selects the digital representation and/or may be uploaded to the cloud (e.g., in an associated digital interaction data set 230) only when the user has requested the image be uploaded to the cloud. This may be done, for example, to ensure any obscene images are not uploaded and/or to keep the file size in the cloud manageable and/or to ensure only relevant images are uploaded.

Each digital interaction representation may include any number of visual components. The digital interaction representation 440 (or any digital interaction), for example, may include a digital interaction icon 445 that may graphically represent the type of digital interaction. The digital interaction icon 445 may include an image of a phone, a social media logo, a document, etc. that represents the source or provider of the digital interaction. The digital interaction icon 445 may include a representation of an associated image, associated video, or associated file, etc.

The digital interaction representation 440 (or any digital interaction), for example, may include a representation of the digital interaction type 450. The digital interaction type 450 may indicate the type of digital interaction such as, for example, SMS message, text message, social media message, phone call, GPS location, etc.

The digital interaction representation 440 (or any digital interaction), for example, may include a representation of the digital interaction date/time 455. The digital interaction data/time 455 may, for example, indicate the date and/or time the digital interaction occurred. The digital interaction data/time 455 may, for example, indicate the duration of the digital interaction.

The digital interaction representation 440 (or any digital interaction), for example, may include a representation of the digital interaction direction 460. The direction of the digital interaction may indicate the direction of the digital interaction from the sender to the receiver of the digital interaction. The direction of the digital interaction representation 440 is represented by an arrow that shows the direction of the digital interaction from individual 1 to individual 2.

The digital interaction representation 440 (or any digital interaction), for example, may include a representation of digital interaction receiver 465. In this example, the receiver of the digital interaction is individual 3. The representation of digital interaction receiver 465 may include any type of graphical element that shows individual 3 as the receiver.

The digital interaction representation 440 (or any digital interaction), for example, may include a representation of the digital interaction is the sender of the of the digital interaction such as, for example, any type of graphical element that shows individual 1 as the sender.

In some embodiments, the graphical representation 400 may include an additional column or columns showing interactions with individuals that are not associated with column such as, for example, an individual other than individual 1, individual 2, and/or individual 3. In some embodiments, the additional column may represent digital interactions between one or more of the individuals shown in the columns and all other individuals. The additional column, for example, may include information that includes the name or an identifier of the additional individual. In some embodiments, the digital interaction in the additional column may be selected or clicked by a user to reveal additional information. In some embodiments, the digital interaction in the additional column may be selected or clicked by a user to create a new column with this individual along with all the digital interactions between the existing individuals and this individual.

Figure 5:
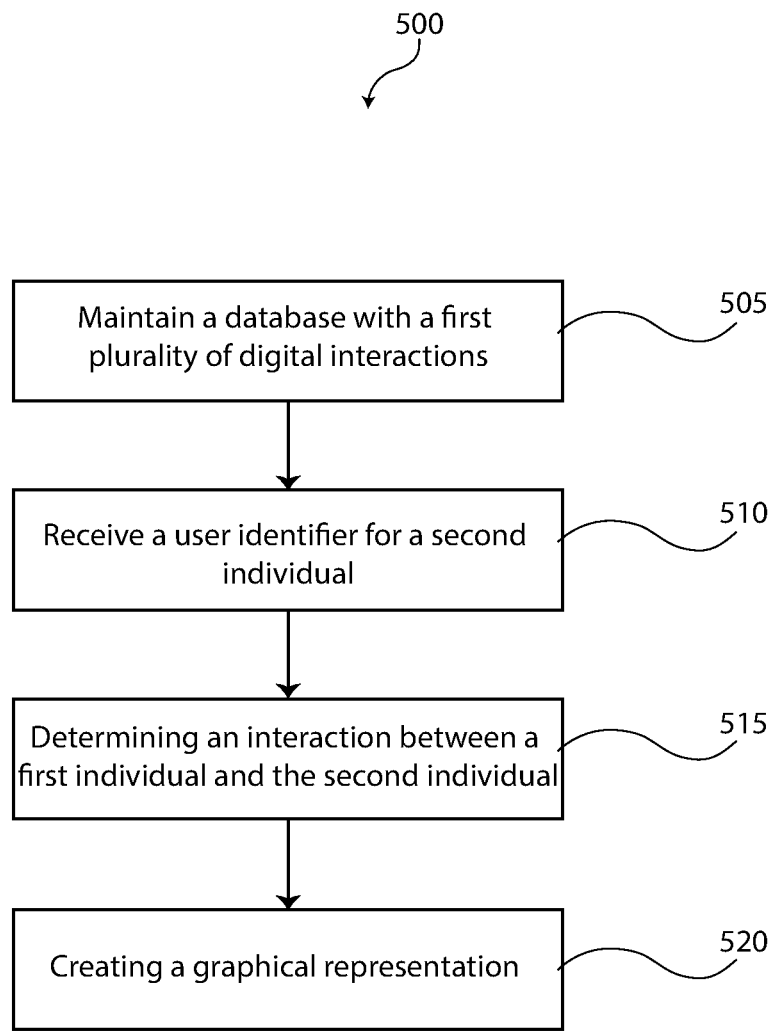
FIG. 5 is a flowchart of a process for providing a subject filtering tool for a digital interaction database according to some embodiments

FIG. 5 is a flowchart of a process 500 for providing a subject filtering tool for a digital interaction database according to some embodiments. The blocks of process 500 may occur in any order. Additional blocks may be added to process 500. Some blocks may be removed, skipped, or modified. The process 500 may be executed by computational system 600 and/or cloud computing system 700.

At block 505 a first input file may be maintained in a digital interaction database. The first input file may include a first plurality of digital records of interaction between a first identifier associated with a first individual and a first plurality identifiers associated with a first plurality of individuals. The first plurality of digital records may have been recorded by a first provider.

The first digital interaction, for example, may include a cell phone record, a text message record, an email record, a social media record, a messenger record, a WhatsApp record, a snapchat record, a financial transaction record, a GPS tracker, mobile phone GPS data, etc.

The first provider, for example, may include a mobile phone carrier (e.g., Verizon, AT&T, T-Mobile, Sprint, etc.), a social media company (e.g., Facebook, LinkedIn, SnapChat, Instagram, TikTok, etc.), a messaging company (e.g., messenger, WhatsApp, WeChat, iMessage, Messages, etc.), a mobile phone provider (e.g., Android, Apple, etc.), a map company (e.g., Google Maps, Apple Maps, etc.), an advertising id tracking company (e.g., Babel X), etc.

At block 510 a user identifier associated with a second individual may be received and/or entered into the digital interaction database such as, for example, via a webpage hosted by a cloud computing system.

At block 515 a digital interaction between the first individual and the second individual may be determined, created, established, found, etc. For example, the second identifier may be searched for in the first digital interaction database. A digital interaction may be determined to have occurred between the first individual and the second individual if the second identifier is found within the first digital interaction database. The digital interaction, for example, may include a date, a time, a duration, geolocation data, etc.

The digital interaction, for example, may include one or more of the following: a phone call between the first individual and the second individual, a text message between the first individual and the second individual, an SMS message between the first individual and the second individual, a WhatsApp message between the first individual and the second individual, a messenger message between the first individual and the second individual, a Facebook (or other social media) comment between the first individual and the second individual, etc., etc. In some embodiments, a digital interaction may include any type of recorded interaction between two parties via electronic means.

A digital interaction between the first individual and the second individual, for example, may be determined based on the data item key connectors 225.

At block 520 a graphical representation may be created for display on a screen. The graphical representation may be part of a webpage stored or hosted at a cloud computing location.

The graphical representation, for example, may include a representation of the digital interaction between the second individual and the first individual may include the digital interaction representation 420 and/or the digital interaction representation 425.

The graphical representation, for example, may include a representation of one or more of the following: a date, a name, the interaction type (e.g., a logo, icon, emoji, gui, etc.), a digital interaction sender, a digital interaction receiver, a duration of the digital interaction, etc. In some embodiments, the graphical representation may be organized chronologically. In some embodiments, the graphical representation may include digital interactions that occurred within a specific or user specified time period.

The graphical representation, for example, may include columns showing different individuals or subjects and a plurality of digital interactions for each individual.

A digital interaction, for example, between the first individual and the second individual may be determined from the first plurality of digital interactions, and a similar digital interaction may be determined from the second plurality of digital interactions. A de-duplication process may occur. The de-duplication process, for example, may analyze a set of digital interactions and determine whether two digital interactions may be the same such as, for example, by analyzing the sender of the digital interaction, the date of the digital interaction, the type of digital interaction (e.g., phone, message, text, social media, etc.), the date and time of the digital interaction, the duration of the digital interaction, etc.

Figure 6:
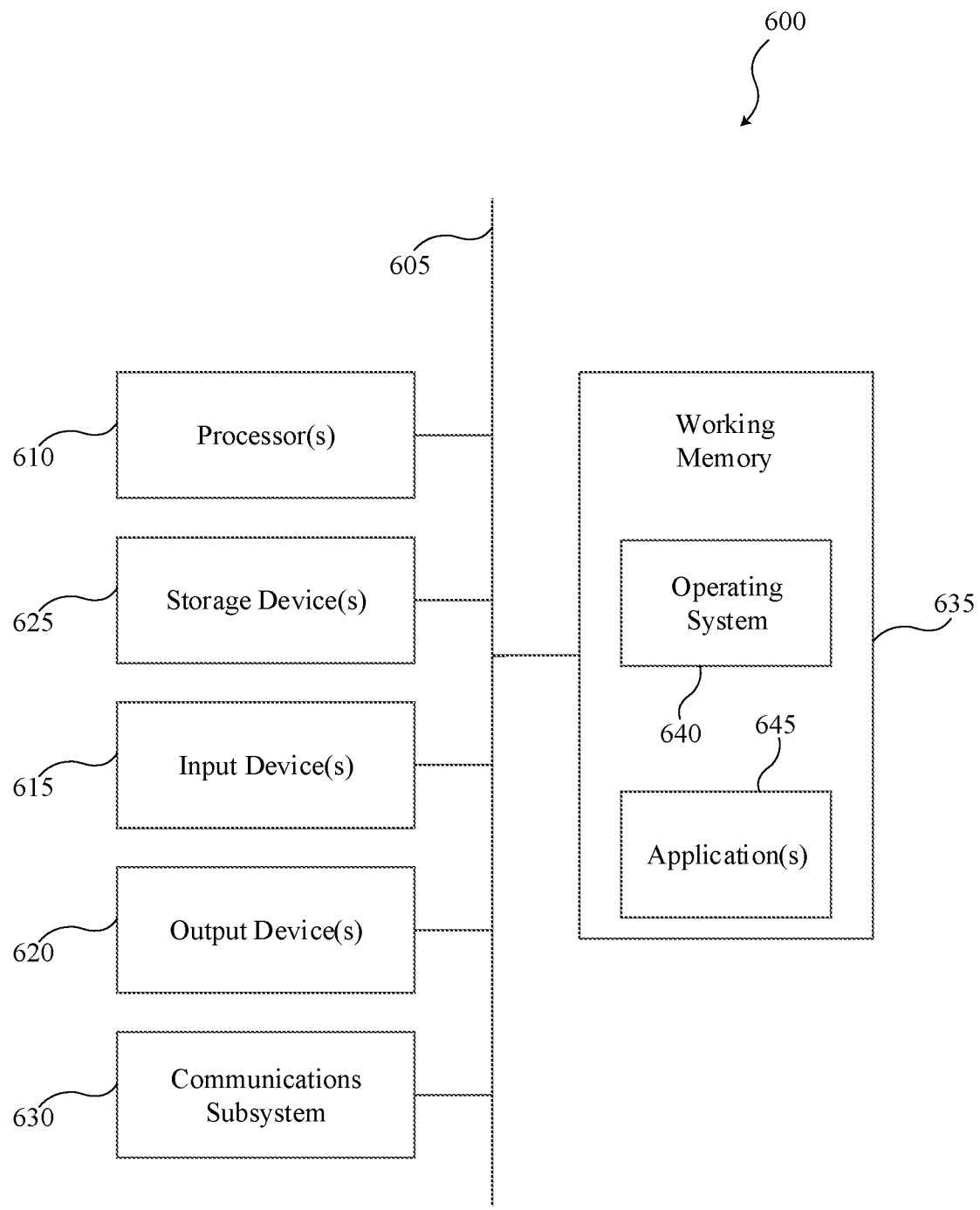
FIG. 6 is a block diagram of a computational system that can be used with or to perform some embodiments described in this document.

The computational system 600, shown in FIG. 6 can be used to perform any of the embodiments of the invention. For example, computational system 600 can be used to store and/or create the digital interaction database 105 or digital interaction data set descriptors 220 or one or more digital interaction data sets 230 or data set directory 240, and/or execute processes 300. As another example, computational system 600 can perform any calculation, identification and/or determination described here. Computational system 600 includes hardware elements that can be electrically coupled via a bus 605 (or may otherwise be in communication, as appropriate). The hardware elements can include one or more processors 610, including without limitation one or more general-purpose processors and/or one or more special-purpose processors (such as digital signal processing chips, graphics acceleration chips, and/or the like); one or more input devices 615, which can include without limitation a mouse, a keyboard and/or the like; and one or more output devices 620, which can include without limitation a display device, a printer and/or the like.

The computational system 600 may further include (and/or be in communication with) one or more storage devices 625, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 600 might also include a communications subsystem 630, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 630 may permit data to be exchanged with a network (such as the network described below, to name one example), and/or any other devices described in this document. In many embodiments, the computational system 600 will further include a working memory 635, which can include a RAM or ROM device, as described above.

The computational system 600 also can include software elements, shown as being currently located within the working memory 635, including an operating system 640 and/or other code, such as one or more application programs 645, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 625 described above.

In some cases, the storage medium might be incorporated within the computational system 600 or in communication with the computational system 600. In other embodiments, the storage medium might be separate from a computational system 600 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 600 and/or might take the form of source and/or installable code, which, upon compilation and/or installation on the computational system 600 (e.g., using any of a variety of generally available compilers, installation programs, compression/decompression utilities, etc.) then takes the form of executable code.

Figure 7:
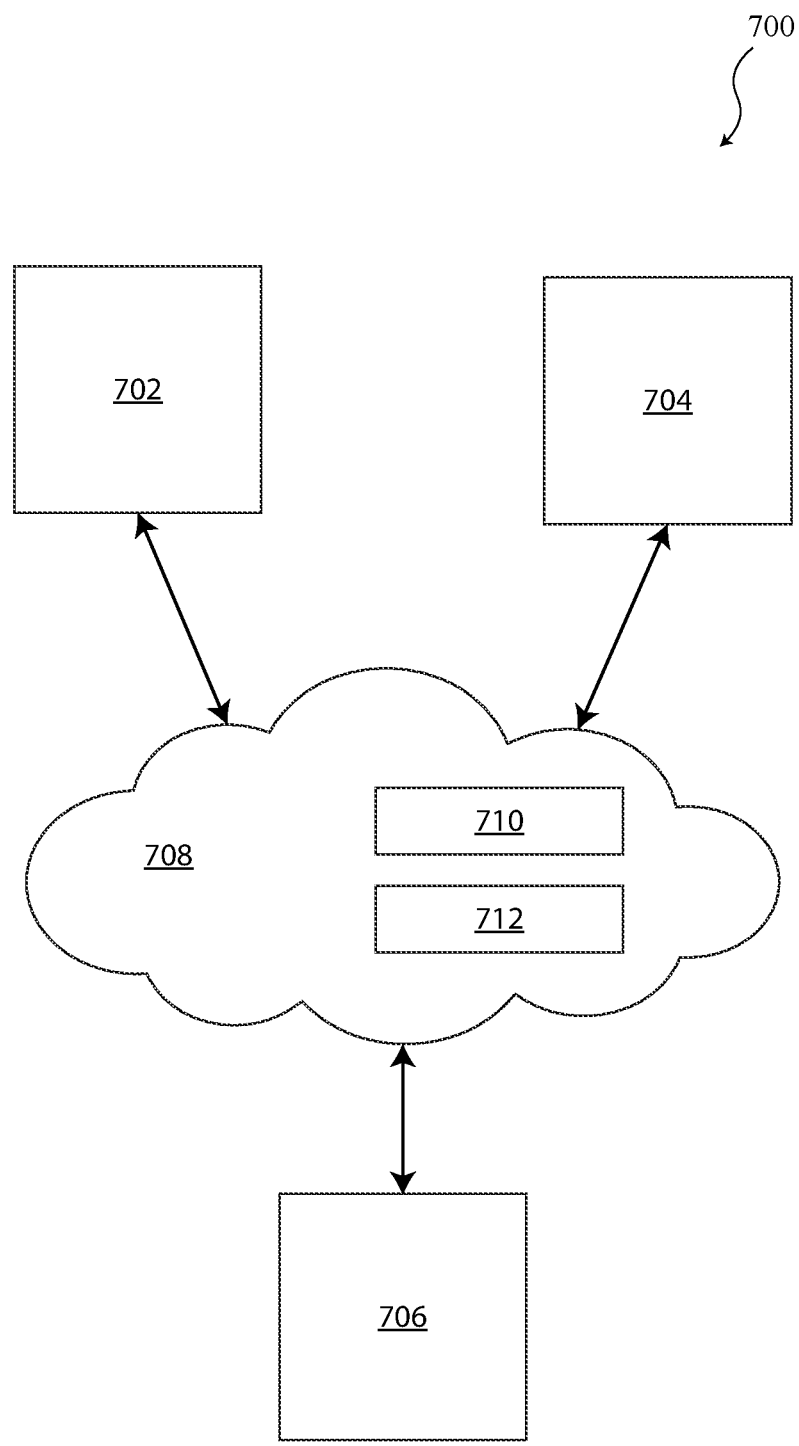
FIG. 7 illustrates an example cloud computing system according to some embodiments.

FIG. 7 illustrates an example cloud computing system 700 according to some embodiments. The cloud computing system 700, for example, includes clients 702, 704, and 706 connected to a computing cloud 708. The computing cloud 708, for example, includes processing unit 710 and data storage unit 712, both of which are accessible to clients 702, 704, and 706.

The computing cloud 708, the clients 702, 704, and 706, and/or the data storage unit 712 may include one or more or all of the components of computational system 600.

The computing cloud 708, for example, may be capable of both storing information and performing data functions on information. The computing cloud 708 includes at least one computer that is accessible from a remote location. The computing cloud 708, for example, may include a plurality of storage devices that will be referred to as collectively the data storage unit 712, as well as a plurality of processing units that will be referred to collectively as the processing unit 710. The computing cloud 708, for example, may include hardware that is cost prohibitive to deploy and maintain at individual clients 702, 704, and 706. The computing cloud 708, for example, may include software that is cost prohibitive to install, deploy, and maintain at individual computing clouds. The computing cloud 708 may, for example, may provide this hardware and software through secure connections to the clients 702, 704, and 706. While there is one computing cloud 708 shown in FIG. 7, it is explicitly understood that a plurality of clouds may be consistent with this disclosure. It is understood that the disclosed historian system can collect, store, and retrieve data for multiple clients, multiple systems within a single client, as well as multiple systems located within multiple clients.

The clients 702, 704, and 706 may include individual computers, tablets, or mobile devices that are in communication with the computing cloud 708. The clients 702, 704, and 706 are capable of accessing both the processing unit 710 and data storage unit 712 that are located in the computing cloud 708. The clients 702, 704, and 706 are able to access both local processes as well as information from the computing cloud 708. The clients 702, 704, and 706 may comprise a plurality of manufacturing tools and sensors to monitor the manufacturing tools. These sensors may detect any operational condition of the manufacturing tools, including, but not limited to, the temperature, vibration, or other measurable operating parameter.

The clients 702, 704, and 706 communicate with the computing cloud 708 through any secured or unsecured method, including Hypertext Transfer Protocol Secure (HTTPS), secure telnet, or file transfer protocol secure (FTPS). Secure methods, for example, may be preferred over unsecure methods, and that the particular method chosen will depend upon the requirements of the function being accessed. This document should not be interpreted as being limited to any particular protocol or method of transferring data. Various other data transfer protocols may be used.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

The terms "first", "second", "third", etc. are used to distinguish respective elements and are not used to denote a particular order of those elements unless otherwise specified or order is explicitly described or required.

Numerous specific details are set forth to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computing cloud comprising at least one data storage unit and at least one memory device configured to store instructions and at least one computer processing unit configured to execute the instructions, wherein the computing cloud:

maintains in a digital interaction database stored in the data storage unit a first input file comprising a first plurality of digital records of interaction between a first identifier associated with a first individual and a first plurality identifiers associated with a first plurality of individuals, the first plurality of digital records having been recorded by a first provider;

maintains in the digital interaction database a second input file comprising a second plurality of digital records of interaction between a second identifier associated with a second individual and a second plurality of identifiers associated with a second plurality individuals, the second plurality of digital records having been recorded by a second provider, the second provider being different and distinct from the first provider;

creates a first digital interaction between the first individual and the second individual based on the first plurality of digital records of interactions and the second plurality of digital records of interactions corresponding to a first actual digital interaction between the first individual and the second individual;

creates a second digital interaction between the first individual and the second individual based on the first plurality of digital records of interactions and the second plurality of digital records of interactions corresponding to a second actual digital interaction between the first individual and the second individual, wherein the first actual digital interaction is a different type of digital interaction than the second actual digital interaction, wherein the type of digital interaction is selected from the group consisting of a phone call, an SMS message, a text message, a social media message, a social media post, and a social media comment; and creates a webpage having a graphical representation comprising:

a graphical representation of the digital interaction between the first individual and at least a portion of the first plurality of identifiers associated with the first plurality of individuals;

a graphical representation of the digital interaction between the second individual and at least a portion of the second plurality of identifiers associated with the second plurality of individuals;

a graphical representation of the first digital interaction with an indication showing the type of the first digital interaction; and a graphical representation of the second digital interaction with an indication showing the type of the second digital interaction.

2. The computing cloud according to claim 1, wherein the graphical representation of the interaction between the first individual and at least a portion of the first plurality of identifiers associated with the first plurality of individuals further comprises:

a graphical representation of the first individual, and a chronological listing of at least a portion of the first plurality of identifiers associated with the first plurality of individuals.

3. The computing cloud according to claim 1, wherein the graphical representation of the interaction between the second individual and at least a portion of the second plurality of identifiers associated with the second plurality of individuals further comprises:

a graphical representation of the second individual, and a chronological listing of at least a portion of the second plurality of identifiers associated with the second plurality of individuals.

4. The computing cloud according to claim 1, wherein the representation of the first digital interaction includes the date of the digital interaction.

5. The computing cloud according to claim 1, wherein the representation of the first digital interaction includes the duration of the digital interaction.

6. The computing cloud according to claim 1, wherein the representation of the first digital interaction includes the content of the digital interaction.

7. The computing cloud according to claim 1, wherein the representation of the first digital interaction includes images sent as part of the digital interaction.

8. The computing cloud according to claim 1, wherein the representation of the first digital interaction includes an indication of the sender of the digital interaction and the receiver of the digital interaction.

9. A computing cloud comprising at least one data storage unit and at least one memory device configured to store instructions and at least one computer processing unit configure to execute the instructions, wherein the computing cloud:

maintains in a digital interaction database stored in the data storage unit comprising a first input file comprising a first plurality of digital records of interaction between a first identifier associated with a first individual and a first plurality identifiers associated with a first plurality of individuals, the first plurality of digital records having been recorded by a first provider;

maintains in the digital interaction database a second input file comprising a second plurality of digital records of interaction between a second identifier associated with the first individual and a second plurality of identifiers associated with a second plurality individuals, the second plurality of digital records having been recorded by a second provider, the second provider being different and distinct from the first provider;

maintains in the digital interaction database a third input file comprising a third plurality of digital records of interaction between a third identifier associated with a third individual and a third plurality of identifiers associated with a third plurality individuals, the third plurality of digital records having been recorded by a third provider;

creates, from the digital interaction database, a first digital interaction between the first individual and the third individual;

creates, from the digital interaction database, a second digital interaction between the first individual and the second individual, wherein the first digital interaction is a different type of digital interaction than the second digital interaction, wherein the type of digital interaction is selected from the group consisting of a phone call, an SMS message, a text message, a social media message, a social media post, and a social media comment; and creates a webpage having a graphical representation, the graphical representation comprising:

a graphical representation of the interaction between the first individual and at least a portion of the first plurality of identifiers associated with the first plurality of individuals and at least a portion of the second plurality of identifiers associated with the second plurality of individuals;

a graphical representation of the interaction between the third individual and at least a portion of the third plurality of identifiers associated with the third plurality of individuals;

a graphical representation of the first digital interaction with an indication showing the type of the first digital interaction; and a graphical representation of the second digital interaction with an indication showing the type of the second digital interaction.

10. The computing cloud according to claim 9, wherein each digital interaction within the digital interaction database comprises at least a date of the digital interaction, a time of the digital interaction, an identifier identifying the sender of the digital interaction, and an identifier identifying the receiver of the digital interaction.

11. The computing cloud according to claim 9, wherein each digital interaction within the digital interaction database comprises at least one of the following: a location of the sender of the digital interaction, a location of the receiver of the digital interaction, a cell tower location associated with a sender of the digital interaction, a cell tower location associated with a receiver of the digital interaction, digital interaction content, photos, text, and a duration of the digital interaction.

12. The computing cloud according to claim 9, wherein the first input file is organized differently than the third input file.

13. The computing cloud according to claim 9, wherein the first input file includes data that is not included in the third input file.

14. The computing cloud according to claim 9, wherein the first provider or the third provider comprises a cell phone carrier.

15. The computing cloud according to claim 9, wherein the first provider or the third provider comprises a social media company.

16. The computing cloud according to claim 9, wherein the first input file or the third input file comprises cell phone records.

17. The computing cloud according to claim 9, wherein the first input file or the third input file comprises social media records.

18. The computing cloud according to claim 9, wherein the first input file or the third input file includes a plurality of records, each of the plurality or records including one or more of the following: an interaction date, an interaction time, a sender name, a sender ID, a sender phone number, a sender email address, a sender username, a receiver name, a receiver ID, a receiver phone number, a receiver email address, a receiver username, a GPS location of the sender, a GPS location of the receiver, a tower location of the sender, a tower location of the receiver, a tower identifier of the sender, a tower identifier of the receiver, and interaction content.

19. A method comprising:
  maintaining in a digital interaction database a first input file comprising a first plurality of digital records of interaction between a first identifier associated with a first individual and a first plurality identifiers associated with a first plurality of individuals, the first plurality of digital records having been recorded by a first provider;
  maintaining in the digital interaction database a second input file comprising a second plurality of digital records of interaction between a second identifier associated with the first individual and a second plurality of identifiers associated with a second plurality individuals, the second plurality of digital records having been recorded by a second provider, the second provider being different and distinct from the first provider;
  maintaining in the digital interaction database a third input file comprising a third plurality of digital records of interaction between a third identifier associated with a third individual and a third plurality of identifiers associated with a third plurality individuals, the third plurality of digital records having been recorded by a third provider;
  establishing, from the digital interaction database, a first digital interaction between the first individual and the third individual;
  establishing, from the digital interaction database, a second digital interaction between the first individual and the second individual, wherein the first digital interaction is a different type of digital interaction than the second digital interaction, wherein the type of digital interaction is selected from the group consisting of a phone call, an SMS message, a text message, a social media message, a social media post, and a social media comment; and
  creating a graphical representation comprising:
    a visual representation of the interaction between the first individual and at least a portion of the first plurality of identifiers associated with the first plurality of individuals and at least a portion of the second plurality of identifiers associated with the second plurality of individuals;
    a visual representation of the interaction between the third individual and at least a portion of the third plurality of identifiers associated with the third plurality of individuals; and
    a visual representation of the first digital interaction with an indication showing the type of the first digital interaction; and
    a visual representation of the second digital interaction with an indication showing the type of the second digital interaction.

20. The computing cloud according to claim 1, wherein the first digital comprises an SMS message and the second digital interaction comprises a phone call.

21. The computing cloud according to claim 1, wherein the first digital comprises an SMS message and the second digital interaction comprises a social media message.

* * * * *